Figure 1:
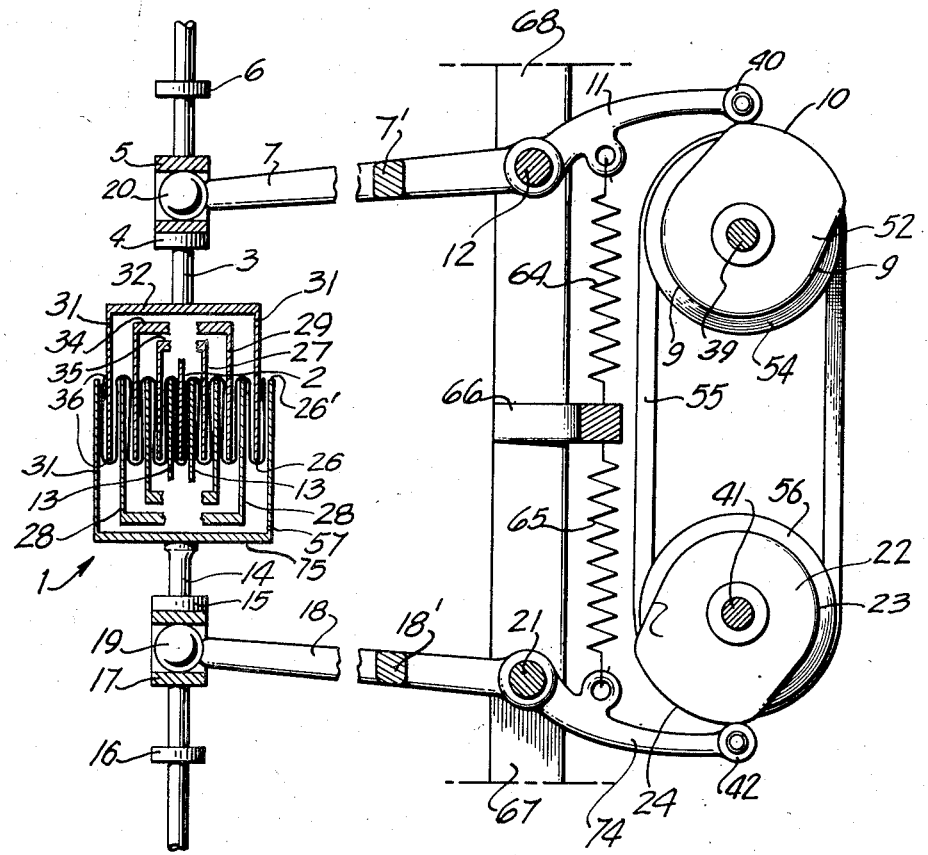

Dec. 28, 1954  M. J. G. TIPPER  2,697,970
APPARATUS FOR PLEATING OF CASINGS AND SIMILAR ARTICLES
Filed Aug. 9, 1952  2 Sheets-Sheet 1

INVENTOR
MAYNARD J. G. TIPPER
BY
ATTORNEYS

Dec. 28, 1954   M. J. G. TIPPER   2,697,970
APPARATUS FOR PLEATING OF CASINGS AND SIMILAR ARTICLES
Filed Aug. 9, 1952                                        2 Sheets-Sheet 2
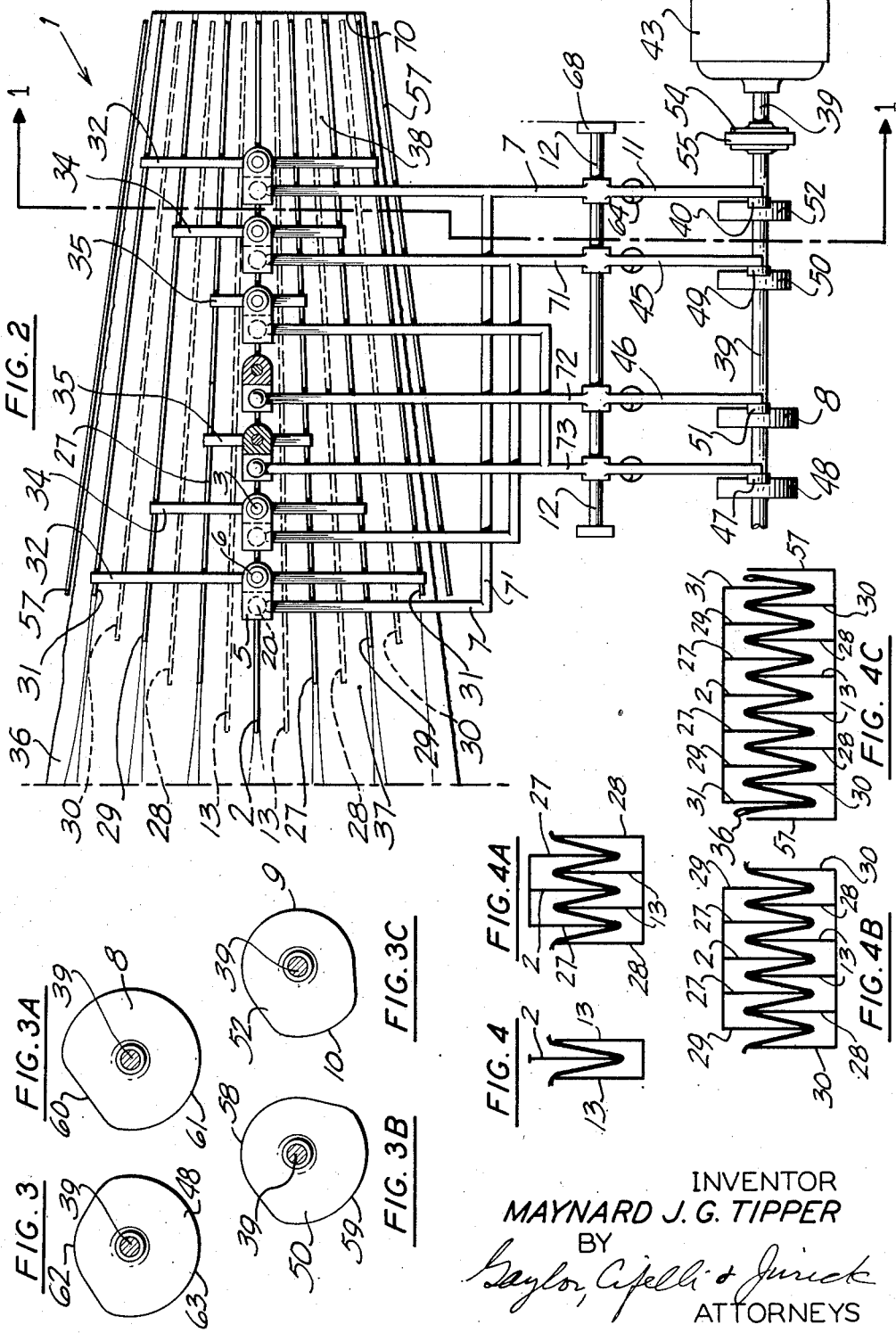
INVENTOR
MAYNARD J. G. TIPPER
BY
ATTORNEYS

United States Patent Office 2,697,970
Patented Dec. 28, 1954

2,697,970

APPARATUS FOR PLEATING OF CASINGS AND SIMILAR ARTICLES

Maynard J. G. Tipper, Sacramento, Calif., assignor of one-half to Albert O. Steckman, Newark, N. J.

Application August 9, 1952, Serial No. 303,625

1 Claim. (Cl. 93—84)

This invention deals with a method and machine for pleating sheet material such as sausage casing ends.

Among the novel features involved is the production of a tapered pleat, the movement of both the upper and lower pleating blades, means for moving vertically in proper unison and sequence the pleating blades, as well as other features as will be set forth herein.

The invention will be more readily understood by reference to the drawings in which Figure 1 represents an end view, partly in cross section of the pleating unit as well as part of the drying means therefor taken along line 1—1 of Figure 2. A top view (partly in cross section) of the pleating unit and the operating and driving means therefor are depicted in Figure 2. Figures 3, 3A, 3B and 3C are side views of the cams used in making the various pleats, while Figures 4, 4A, 4B and 4C represent schematically the end views during the successive pleating operations. Similar numerals represent similar parts in the various figures.

Referring again to the drawings, numeral 1 represents the pleating unit consisting of a series of laterally disposed upper blades 2, 27, 29 and 31, and spaced interleaving lower blades 13, 28, 30 and 57 between which the sheet material, such as a sausage casing, is disposed when it is pleated. It will be observed that the blades are spaced further apart at the rearward end 37 than the forward end 38, (the latter being adjacent to free end 70 of casing 36), whereby a tapered pleat is produced.

Also, it will be observed that, aside from the middle blade 2, the other blades are connected in pairs to move in unison. For example, upper blades 27 are connected by cross bar 35 to which is attached the rocker arm assembly for raising and lowering the pair of blades. Blades 29 are similarly connected by crossbar 34, and blades 31 by crossbar 32. Likewise, lower blades 13, 28, 30 and 57 are similarly connected. Both lower and upper blades making the same pleat are moved in unison, but not necessarily simultaneously, toward each other, the casing 36 being disposed therebetween. The sizes of the blades in the drawing are exaggerated to show them in greater detail.

The rocker arms 7, 71, 72 and 73, etc. are driven by cams attached to upper shaft 39 and lower shaft 41. Upper shaft 39 is driven by electric motor 43 and is connected to and drives lower shaft 41 by belt or chain drive 55 mounted on pulleys 54 and 56 attached to shafts 39 and 41 respectively. As can be seen from Figures 3, 3A 3B and 3C, the effective cam areas 63, 61, 59 and 10 for the upper cams (and similarly for the lower ones) are designed so that the pleats are made from the center, as shown in Figures 4, 4A, 4B and 4C.

The first pleat is made (after casing 36 is inserted between upper and lower blades) by the action of cam 8 and its lower coacting cam.

The rocker arm action is illustrated in Figure 1 which shows the assembly for making the last pair of pleats. Upper cam 52 on shaft 39 and lower cam 22 on shaft 41 are rotating at the same speed. When cam followers 40 and 42 reach the effective (or raised) cam surfaces 10 and 24 respectively at slightly different time periods, arm 11 (which is mounted on fixed pivot 12) is raised, and consequently its extension, arm 7 is lowered. The end of arm 7 terminates in bearing surface 20 riding in bearing 5 attached to vertical rod 3. The latter rod reciprocates vertically in sleeve bearings and guides 6. The effective lengths of cam surfaces 9 and 24 are such that upper blades 31 are completely depressed by arm 7, before lower blades 57 are raised by arm 18.

Accordingly, when arm 74 (which is mounted on fixed pivot 21), is depressed, arm 18, which is an extension of arm 74, is raised. The end of arm 18 terminates in a bearing surface 19 riding in bearing 17 which is attached to rod 14 that reciprocates vertically in guides and bearings 16. Upper rod 3 is affixed to crossbar 32 holding blades 31, while lower rod 14 is attached to crossbar 75 carrying lower blades 57. The effect of the combined action is to cause blades 31 and 57 to interleave, within a fixed time interval with each other, while the casing 36 is disposed therebetween, with the pressure from blade ends 26 and 26' forming the last pleat on the casing. Fixed pivots 12 and 21 are preferably mounted on a stand, the lower part 67 of which is fixed to the base (not shown), while the upper part 68 is supported or otherwise held. Springs 64 and 65 mounted on support 66 and arms 11 or 74, are employed to insure a tight contact of cam followers 40 and 42 with cams 52 and 22 respectively.

The complete operation of the unit is as follows:

The bottom and top blades are apart in the idle condition and casing 36 is inserted therebetween for the pleating operation. As motor 43 turns shaft 39, which, through belt 55 turns lower shaft 41 at the same speed, cam follower 51 reaches high point 61 on pulley 8 which then causes rocker arm 46 to be lifted and arm 72 (an extension of arm 46) to be lowered, causing blade 2 to be lowered in the same manner as outlined for blades 31 in Figure 1. In the case of these blades forming the first pleat, however, they are moved simultaneously. Blades 13 otherwise, are raised in the same manner as outlined for blades 57 in Figure 1. The result is the simultaneous formation of the first pleat as shown in Figure 4. Then, a pleat is made on each side of the first pleat first by blades 27 being forced completely down when follower 47 reaches top portion 63 on cam 48, and thereafter, blades 28 being forced up. Meanwhile, blades 2 and 13 are held together so that the first pleat is not pulled out. This is possible because of the longer active area or high section 61 on cam 8.

Thereafter, while the first two sets of pleating blades are still holding the pleats they have made, cam follower 49 reaches the high point 59 on cam 50 causing blades 29 being forced completely down, and thereafter, in succession, the corresponding lower cam raises blades 30 upwardly, resulting in the formation of two more pleats by the successive interleaving action of upper blades 29 with lower blades 30. Finally, when cam follower 40 reaches the top portion 10 of cam 52, the last set of pleats are made by downward movement of upper blades 31 followed by upward movement of lower blades 57. Meanwhile, all of the other pleats are held in place by their corresponding blades. Although the upper cams have been mentioned mostly, it is to be understood that the lower cams mounted on shaft 41 also cause the raising of their blades in succession after the lowering of the corresponding interleaving blades actuated by the cams on shafts 39. It is thus seen that the first pleat is made by simultaneous interleaving of blade 2 with blades 13. All of the other pleats are made by successive interleaving of upper and lower blades after each series of blades has completed its maximum travel. Such an action has been found to eliminate entirely the distortion or straining of the casing material.

Thereafter, after all of the pleats have been made, all of the cam followers slide down simultaneously to the lower or inactive cam surfaces 60, 62, 58 and 9, respectively on the cams on shaft 39, as is the same with those on shaft 41, leaving the pleated casing ready for fastening and withdrawal from the machine. When the pleat is fastened by means of a fastener, the latter is attached to the pleated end 70 of the casing before the cam followers drop to their inactive surfaces.

It is preferable that the rear portions of the outer blades be consecutively shorter than those of the inner ones, as shown in Figure 2. Blades 57 and 31 are shorter than blades 28 and 29 which, in turn, are shorter than blades 27 and 28 which, also in turn, are shorter than blades 2 and 13. The pleats are made much more readily when both lower and upper blades are moved than when only the upper blades are moved over stationary lower blades.

The widening of the spaces between the rear ends of the blades, as compared to the forward ends, not only prevents excessive stress and strain upon the casing at the rearward area of the blades, but also makes pleating much easier.

The ends of shafts 39 and 12 are anchored to the base in any conventional manner. Also, in order to distribute pressure, several arms are preferably used in the rocker arm operation, as is exemplified by arms 7 which are interconnected by crossarm 7'. Lower arms 18 are similarly connected by crossarm 18'. Although only one guide 6 or 16 is shown for holding rods 3 or 14, it is apparent that at least another one is used for each rod. For convenience, they have not been shown in the drawing.

I claim:

In a pleating apparatus for making pleats at the end of a sheet material and having a series of laterally spaced upper blades and a series of laterally spaced lower blades adapted to interleave therewith, between which series the end of the sheet material is disposed, said blades having forward ends adjacent the edge of said sheet material and rearward ends disposed further into the end of the sheet material, the invention comprising means for supporting the blades for bodily movement in a vertical direction to effect simultaneous pleating of the forward and rearward portions of said sheet material, a series of upper rocker arm means connected to the series of upper blades and adapted to move said upper blades bodily vertically and downwardly into interleaving relation with the lower blades, a series of lower rocker arm means connected to the series of lower blades and adapted to move said lower blades bodily vertically and upwardly into interleaving relation with the upper blades, both series of rocker arm means being connected to independent series of individual cams adapted to effect an interleaving of the blades from the center outwardly and simultaneously toward both sides, and said blades being spaced farther apart at the rearward end than at the forward ends, whereby a tapered pleat is produced.

References Cited in the file of this patent

UNITED STATES PATENTS

| Number | Name | Date |
|---|---|---|
| 336,656 | McCreary et al. | Feb. 23, 1886 |
| 2,484,390 | Thorpe et al. | Oct. 11, 1949 |